Dec. 4, 1923.

W. C. RASTETTER 1,476,673

STEERING WHEEL CONSTRUCTION

Filed May 18, 1921    2 Sheets-Sheet 2

William C. Rastetter INVENTOR

BY

Walter H. Burns ATTORNEY

Patented Dec. 4, 1923.

1,476,673

UNITED STATES PATENT OFFICE.

WILLIAM C. RASTETTER, OF FORT WAYNE, INDIANA.

STEERING-WHEEL CONSTRUCTION.

Application filed May 18, 1921. Serial No. 470,522.

*To all whom it may concern:*

Be it known that I, WILLIAM C. RASTETTER, a citizen of the United States of America, and resident of Fort Wayne, in the county of Allen and State of Indiana, have invented certain new and useful Improvements in Steering-Wheel Constructions, of which the following is a specification.

This invention relates to improvements in steering wheel construction, and the object thereof is to provide a wheel of that type used on the steering gear of automobiles in which a wooden rim is mounted in connection with a metallic spider, and to so form the ends of the spider arms and the cavities in the wooden rim for the reception of the ends of the arms that the arms will be firmly held in connection with the rim when the parts of the wheel have been assembled. Another object is to so form the connections of the spider arms and rim as to facilitate assemblage of the parts forming the wheel and to insure permanence of the connections between the spider arms and rim.

Figure 1:
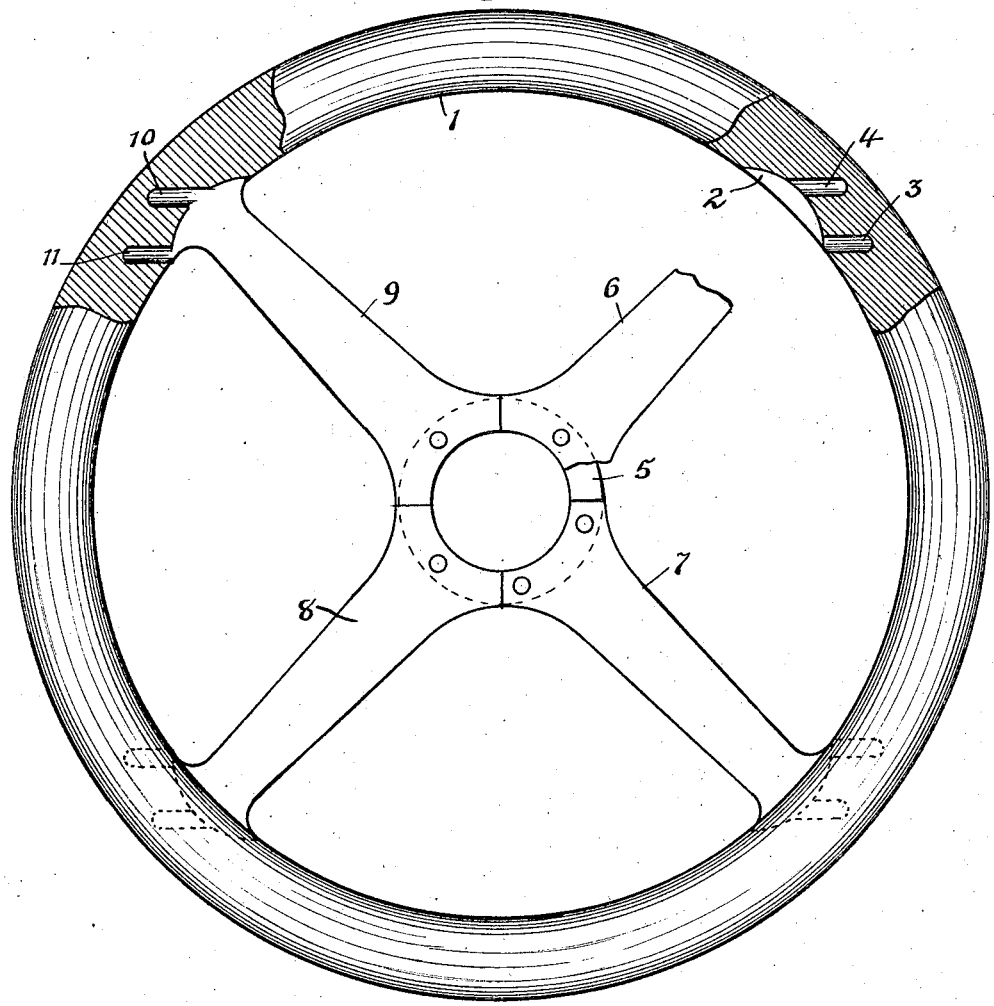
Figure 2:
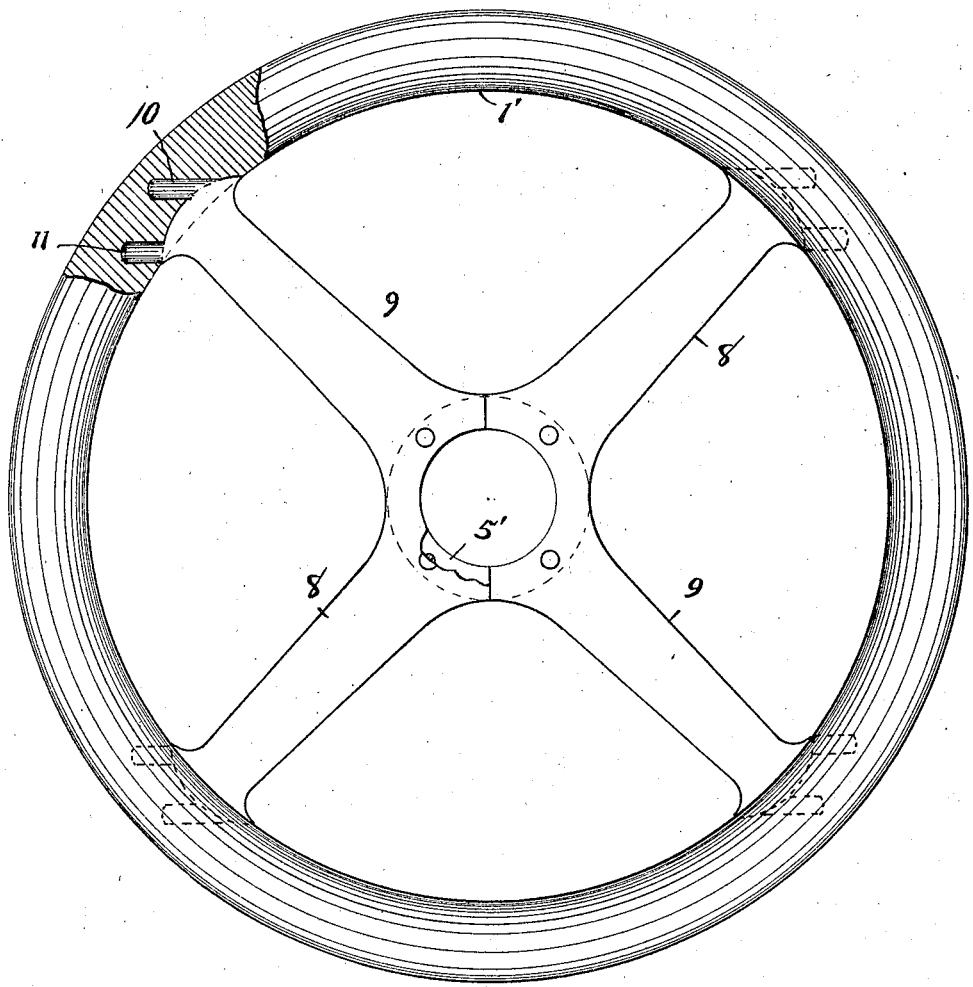

These objects are accomplished by the construction illustrated in the accompanying drawings which Fig. 1 is a plan view of a wheel embodying the invention, there being portions broken away and Fig. 2 is a similar view showing a modified form of the invention.

The characters included in the description refer to parts designated by corresponding characters on the drawings, and referring now to the same:—

1 is a wooden rim in the inner edge of which are made a series of semicircular kerfs 2. Also, coincident with each kerf are made a pair of parallel holes 3 and 4 that extend in planes situated between the center and circumference of the wheel.

The spider for the wheel is comprised of a hub from which extend a series of arms 6—7—8 and 9. The end of each arm is shaped so as to fit into the corresponding semicircular kerf in the rim and has also a pair of prongs 10—11 arranged in parallel relation with each other and shaped to fit into the holes 3—4 leading from the kerf. The arms of the spider are made separately from the hub and are riveted permanently in position on the hub after their outer ends have been positioned in the rim. By thus forming and assembling the parts of the wheel a rigid structure is obtained and the ends of the arms are securely held in connection with the rim without the use of screws as in the ordinary structure.

What I claim is:—

In a steering wheel construction, a wooden rim having a series of kerfs in its inner periphery; a spider, the arms of which are formed in separate pairs, the outer ends of the arms of each pair and the corresponding kerfs being so formed as to admit simultaneous insertion of the ends into the kerfs; and a hub having rigid connection with each pair of arms.

In testimony whereof I affix my signature, in presence of two witnesses.

WILLIAM C. RASTETTER.

Witnesses:
 MATILDA METTLER,
 WALTER G. BURNS.